United States Patent [19]

Roan

[11] 4,058,631

[45] Nov. 15, 1977

[54] ENZYME-TREATED FRIED FOOD

[75] Inventor: Charles F. Roan, Lake Geneva, Wis.

[73] Assignee: GB Fermantation Industries, Inc., Kingstree, S.C.

[21] Appl. No.: 285,289

[22] Filed: Aug. 31, 1972

[51] Int. Cl.$^2$ .................................................. A23B 7/10
[52] U.S. Cl. .................................... 426/52; 426/438; 426/302; 426/637
[58] Field of Search ................ 99/100, 103, 166, 168, 99/207, 83; 426/49, 52, 302, 305, 438, 441, 455, 456, 637; 195/31; 127/38

[56] References Cited

U.S. PATENT DOCUMENTS

| | | | |
|---|---|---|---|
| 2,598,838 | 6/1952 | Shermerhorn | 99/154 |
| 2,779,678 | 1/1957 | Hamilton | 99/100 P |
| 2,784,094 | 3/1957 | Sives | 99/207 |
| 3,175,914 | 3/1965 | Vahlsing | 99/100 P |
| 3,230,094 | 1/1966 | Hilton | 99/100 P |
| 3,394,010 | 7/1968 | Miller | 99/207 |
| 3,424,591 | 1/1969 | Gold | 99/100 P |
| 3,443,964 | 5/1969 | Marotta | 99/83 |
| 3,551,293 | 12/1970 | Seidman | 195/31 |
| 3,595,666 | 7/1971 | Dunning | 195/31 |
| 3,597,227 | 8/1971 | Murray | 99/100 P |
| 3,617,300 | 11/1971 | Borochoff | 99/83 |

*Primary Examiner*—Norman Yudkoff
*Assistant Examiner*—Martin G. Mullen
*Attorney, Agent, or Firm*—Hammond & Littell

[57] ABSTRACT

Fat absorption during frying of raw, starchy food products in fats and oils is reduced by coating the food surface prior to frying with an aqueous solution of alpha amylase enzyme.

2 Claims, No Drawings

ENZYME-TREATED FRIED FOOD

This invention relates to a low calorie, fat-containing, flavorimproved fried food composition. More particularly, the invention relates to the treatment of fried, starchy foods prior to frying in fats and oils, to reduce fat absorption during frying and improve the flavor of the fried food.

One of the most commom metabolic problems among people today is obesity. This condition is due to a greater intake of calories than are expended. Fat is generally the most concentrated form of energy in the diet, with each gram of fat supplying about nine calories. Fat generally constitutes about 40% of the total calories in the diet. Certain food products normally contain an elevated level of fat due to the method of preparation which includes frying in a fat or oil. Consequently, if these food products could be prepared with reduced fat absorption during frying, this would offer a convenient and practical method by which obesity could be decreased without elimination of such foods from the diet.

In accordance with the present invention, it has been found that when the surface of a raw, starchy food product is coated with an aqueous solution of alpha amylase prior to frying, less fat is absorbed in the food during frying than occurs without said treatment and the flavor of the fried food is improved.

The alpha amylase employed in this invention can be obtained from various biological sources but preferably is a fungal or bacterial alpha amylase. The fungal amylases can be produced by fungi such as, for example, *Aspergillus niger* and *Aspergillus oryzae*.

The bacterial amylases can be derived from microorganisms such as, for example, *Bacillus subtilis* and *Bacillus mesentericus*.

A preferred alpha amylase for use in this invention is derived from *Bacillus subtilis* and is a food grade high temperature starch dextrinizing and liquefying enzyme. As such, the enzyme is capable of converting native or modified starches to dextrins or syrups having a Dextrose Equivalent (DE) up to 40. A 40 DE syrup prepared from corn starch will contain 5–7% dextrose, 15–17% maltose and higher polysaccharides. Enzymes of this type also attack Lintner starch and other soluble starches, thereby converting them to dextrins and sugars. The optimum pH range for the dextrinization of soluble starch at 37° C. is 5.2 –6.0, although the enzyme system is useful at this temperature in the range of 4.9 – 6.8. The optimum pH for starch liquefaction at 80° C. is 7.0, although the enzyme is useful in the pH range of 6.5 – 7.8 at this temperature.

Plant and animal amylases such as, for example, malt amylase and pancreatic amylase, respectively, also are suitable sources of alpha amylases.

Still other alpha amylases which can be used in the present invention will be apparent to those skilled in the art and it is to be understood that the invention is not limited to the specific enzyme sources described above.

The food products which can be treated with the enzyme solution in accordance with the invention include foods such as French fried potatoes, potato chips, donuts, and sundry cereal-containing snack food items which are customarily fried in fats and oils prior to retail packaging or by the consumer prior to use.

In general, the raw food product is treated with an aqueous solution of the alpha amylase for a period of time sufficient for the enzymeto penetrate and coat the surface of the food. Soaking of discrete raw potato pieces for about 15 minutes to about one hour generally is sufficient in an aqueous solution containing from about 0.1% to about 1% of alpha amylase enzyme having an activity of from about 10,000 to about 20,000 Bacterial Amylase Units per gram or equivalent alpha amylase. A Bacterial Amylase Unit (BAU) is defined as that quantity of the enzyme that will dextrinize one milligram of starch per minute under standard experimental conditions (AATCC Test Method103–1970) set forth in the AATCC Technical Manual, p. 260–261 (1970).

In the case of products prepared from processed cereals and starches, an aqueous solution of the alpha amylase enzyme can be applied to the surface of the food pieces either by immersion for a short period of time or by means of spray equipment. The enzyme coating of the food product is facilitated by then holding at ambient room temperature or at elevated temperatures not exceeding 100° F prior to frying.

The aqueous solution of the alpha amylase enzyme used for treating the raw starchy food product preferably contains a small amount of sulfur dioxide, for example, up to about 100 parts per million, as an antioxidant.

Any of the conventional frying fats and oils can be used for frying the enzyme-treated raw, starchy food product in accordance with this invention. Such fats and oils include, but are not limited to, animal, vegetable and marine fats and oils such as lard, tallow, cottonseed oil, soy bean oil, coconut oil, palm oil, whale oil, partially hydrogenated fats and oils and similar such glycerides having from about 12 to about 22 carbon atoms in the molecule.

In the case of French fried potatoes, the enzyme-treated, raw potatoes can be deep fat fried such as in a conventional French fryer at about 275° to 400° F until suitably browned.

The following examples will further illustrate the invention although the invention is not limited to these specific examples.

EXAMPLE 1

French fried potatoes were prepared by giving one sample of potatoes a preliminary treatment with enzyme prior to frying while a control sample was fried without the enzyme treatment as follows.

Materials: (1) U.S. Number 1 Idaho Potatoes, Willow Creek Produce Company, Pirie, Idaho. (2) Wallerstein Enzyme WC-8, *Bacillus Subtilis* alpha amylase having about 15,000 BAU units per gram.

Procedure: A 0.2% aqueous solution of the bacteria alpha amylase enzyme was prepared by dissolving about 2.5 grams of the enzyme in one quart of water. One pound of the U.S. Number 1 Idaho Potatoes were peeled and cut into a regular French fry form about six inches long by one-half inch by one-half inch. The French fries were allowed to absorb the bacterial alpha amylase by soaking in tap water. Soaking was conducted for one hour and five minutes. A control sample of one pound of U.S. Number 1 potatoes of similar size and form were placed in tap water without any enzyme and allowed to soak for a similar period of one hour and five minutes. The enzyme treated potatoes and the control potatoes were then both heated at 160° F for seven and one-half minutes followed by heating at 190° F for seven and one-half minutes. The treated potatoes and the control potatoes were then placed in a "Toastmaster" French fryer at 375° F containing a commercial frying fat (Kraft Gold Label Liquid Shortening). The treated potatoes and the control potatoes were fried until they both appeared to be done by observation of similar browning color. The treated potatoes were thus fried for ten minutes whereas the control potatoes were fried for eight minutes. The two samples were then tasted. In a panel of four individuals who tasted the potatoes, it was the unanimous conclusion that the enzyme-treated French fry was preferred since it had less grease in the potato and tasted better than the control sample.

EXAMPLE 2

French fried potatoes were prepared and fried in a deep fat frier as in Example 1. The two samples of French fries, one treated with enzyme solution, the other the control sample without enzyme treatment, were both fried for identical lenghts of time. After the frying, fried potatoes from both samples were subjected to taste and the enzyme treated potatoes were found to have superior taste and eating qualities. The enzyme treated potatoes tasted less fatty and the inside had a consistency more like a baked potato than the untreated fried sample. Five panelists tasted the potatoes from both samples and each stated that they preferred the taste of the enzyme treated sample. Following the above frying, a fat absorption test was conducted on the potatoes by using a cotton dish towel. Potatoes from each sample were pressed on the towel to absorb the fat from the potatoes. The towel was then left to dry so that the moisture from the potato would be evaporated and the remaining grease spots could be observed. It was seen that the enzyme treated sample produced a substantially smaller grease spot on the towel, thereby indicating that the potatoes from that sample had less fat to give up or bleed into the towel.

Three hours after the above test, the enzyme treated sample had a less greasy feel to the touch by hand and to the taste than the untreated sample and had a better appearance in that it appeared to wilt less than the untreated control sample.

EXAMPLE 3

French fried potaotes were again prepared and fried in a deep fat fryer as in Example 2, one sample being enzyme-treated and the other sample being untreated prior to frying to serve as a control sample. Each sample was then subdivided into several parts for replicate determinations of fat content and moisture according to the following procedure:

Weighed potato samples (25–30 grams) were macerated and placed in a vacuum dessicator (with dessicant) for several days until a constant weight was obtained. The deposit of grease on the implements used for each sample maceration was quantitatively removed by thorough wiping with filter paper which was included with the potato sample for the moisture and fat determination.

The weight difference between the initial sample and the dessicated sample was used to calculate the percentage of moisture removed.

Fat was extracted from the entire amount of dessicated sample in a conventional Soxhlet apparatus using petroleum ether as a solvent (20 hours extraction time). The weight of oil collected was compared with the dessicated weight to calculate the percentage of fat removed.

Duplicate determinations were made on all samples.

In this analysis, the duplicate enzyme-treated samples were calculated to contain 13.9% and 15.1% fat content on a dry basis or an average of 14.5% fat whereas the duplicate control samples were calculated to contain 16.8% and 17.6% fat content on a dry basis or an average of 17.2% fat.

Examples of cereal-containing snack food items which can be treated with alpha amylase enzyme solution by immersion or by spraying prior to frying to reduce the fat absorption during frying and improve the flavor are the food chip products such as described in U.S. Pat. Nos. 3,493,390; 3,519,423; and 3,656,966.

Various other examples and modifications of the foregoing examples can be devised by the person skilled in the art after reading the foregoing disclosure and the appended claims without departing from the spirit and scope of the invention. All such further examples and modifications thereof are included within the scope of said claims.

What is claimed is:

1. A process of reducing the absorption of fat during frying of French fried potatoes and improving the flavor and texture of said potatoes comprising soaking the raw potato pieces prior to frying in an aqueous enzyme solution containing from about 0.1% to about 1% by weight of alpha amylase having an activity equivalent to about 10,000 to about 20,000 Bacterial Amylase Units per gram of enzyme for about 15 minutes to about one hour at ambient room temperatures and thereafter frying said potato pieces.

2. The process of claim 1 in which the enzyme is a bacterial alpha amylase.

* * * * *